United States Patent
Van Adrichem et al.

(10) Patent No.: US 9,861,070 B2
(45) Date of Patent: Jan. 9, 2018

(54) SELF-PROPELLED ANIMAL-SHED VEHICLE FOR REMOVING MANURE AND AN ASSEMBLY OF SUCH AN ANIMAL-SHED VEHICLE AND AN ANIMAL-SHED FLOOR

(71) Applicant: LELY PATENT N.V., Maassluis (NL)

(72) Inventors: Paulus Jacobus Maria Van Adrichem, Maassluis (NL); Karel Van Den Berg, Maassluis (NL); Willem Derreke Kok, Maassluis (NL); Frank Gerard Regelink, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 14/428,602

(22) PCT Filed: Sep. 9, 2013

(86) PCT No.: PCT/NL2013/050647
§ 371 (c)(1),
(2) Date: Mar. 16, 2015

(87) PCT Pub. No.: WO2014/051421
PCT Pub. Date: Apr. 3, 2014

(65) Prior Publication Data
US 2015/0223429 A1    Aug. 13, 2015

(30) Foreign Application Priority Data
Sep. 27, 2012 (NL) ....................... 2009526

(51) Int. Cl.
*A01K 1/01* (2006.01)
*B60P 1/38* (2006.01)

(52) U.S. Cl.
CPC .............. *A01K 1/0135* (2013.01); *A01K 1/01* (2013.01); *B60P 1/38* (2013.01)

(58) Field of Classification Search
CPC ........ A01K 1/0135; A01K 1/01; A01K 1/015; A01K 1/0146; A01K 1/0128;
(Continued)

(56) References Cited

U.S. PATENT DOCUMENTS 865,311 A  *  9/1907  Ludlow .................. E01H 1/042
                                                15/84
930,269 A  *  8/1909  Conrath ................ E01H 1/042
                                                15/84
(Continued)

FOREIGN PATENT DOCUMENTS

| AU | 584018 B | 5/1989 |
| EP | 1 100 317 B1 | 11/2004 |
| EP | 1 665 921 A1 | 6/2006 |

*Primary Examiner* — Daniel J Troy
*Assistant Examiner* — Hiwot Tefera
(74) *Attorney, Agent, or Firm* — Birch, Stewart, Kolasch & Birch, LLP

(57) ABSTRACT

Self-propelled animal-shed vehicle for removing manure from a floor, and comprising a frame, a manure pick-up device, and a manure collecting bin, wherein the manure pick-up device comprises a rotating, continuous manure pick-up belt, at least two reversing parts, around which the belt can be rotatably moved, and a drive for moving the manure pick-up belt around the reversing parts, wherein the manure pick-up device during use keeps the manure pick-up belt in contact with the floor by means of a bottom reversing part, and wherein the drive is configured to move the manure pick-up belt at a peripheral speed, in such a manner that the manure pick-up belt moves from a bottom side of the bottom reversing part to a top side of the reversing part along the reversing part. Such a vehicle can keep an animal-shed floor clean in a very efficient manner. The invention also provides an assembly of such an animal-shed vehicle and an animal-shed floor which is configured to separate manure which lands thereon into solid droppings and urine.

19 Claims, 5 Drawing Sheets

Figure 1:
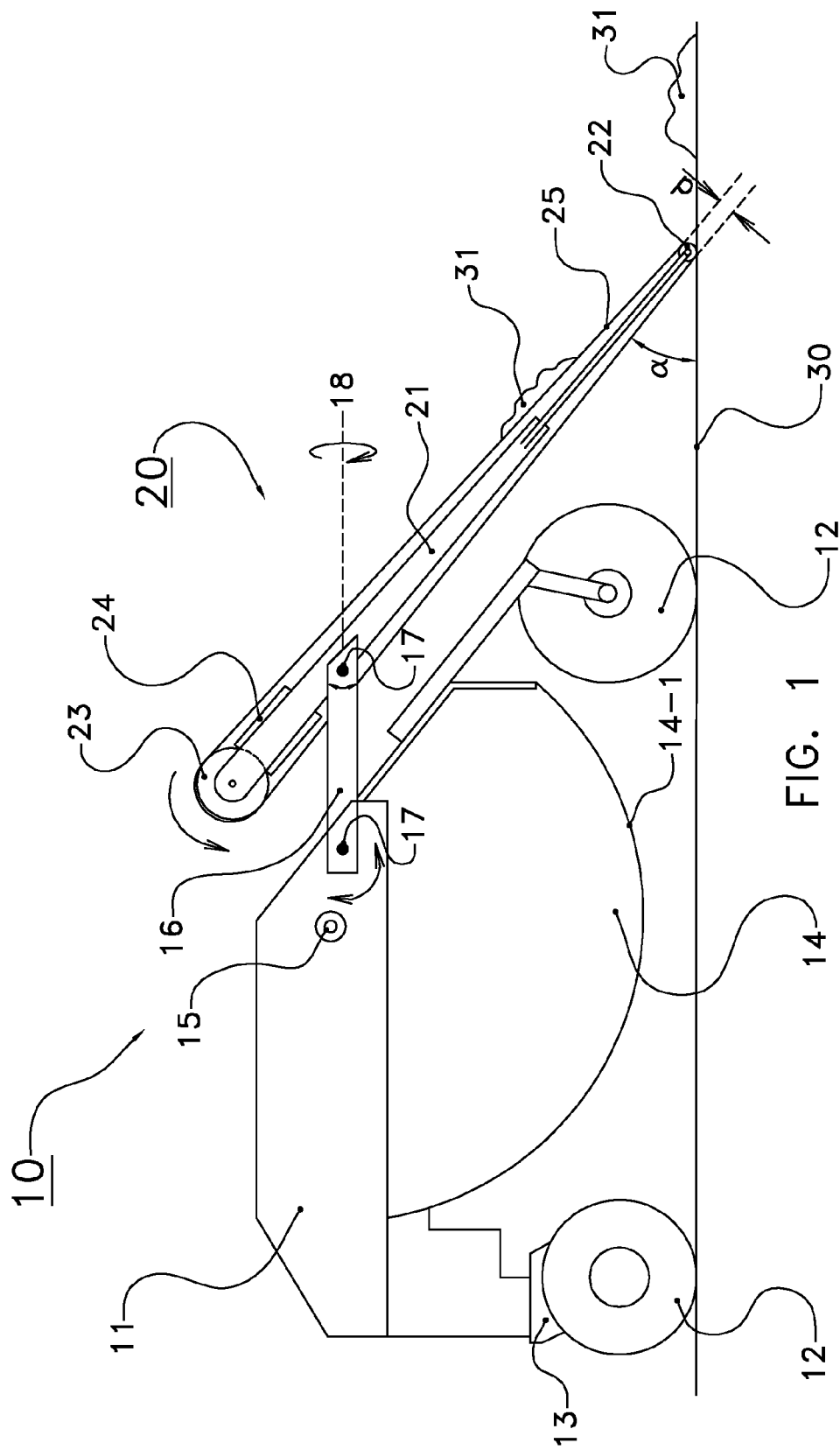

(58) Field of Classification Search
CPC .. A01K 1/0117; A01K 1/0132; A01K 1/0103; A01K 1/011; A01K 1/0152; B60P 1/38; E01H 1/006
USPC ........ 119/451, 164; 414/528, 439, 813, 491, 414/502, 418, 441; 15/21.1, 93.1, 3, 80, 15/83–86
See application file for complete search history.

(56) References Cited

U.S. PATENT DOCUMENTS

| | | | | |
|---|---|---|---|---|
| 2,171,330 | A * | 8/1939 | Custer | A01K 1/0146 198/728 |
| 2,743,829 | A * | 5/1956 | Ballard | B65G 19/20 15/84 |
| 3,209,932 | A * | 10/1965 | Schiltz | A01D 87/12 414/439 |
| 3,927,780 | A * | 12/1975 | Dearlove | B65F 3/18 198/308.1 |
| RE30,404 | E * | 9/1980 | Pereira | B60P 1/38 414/439 |
| 4,417,841 | A * | 11/1983 | Chadwick | A01D 87/121 280/43.23 |
| 4,660,506 | A * | 4/1987 | Nalven | A01K 1/011 119/163 |
| 4,897,183 | A * | 1/1990 | Lewis, Jr. | A01K 1/01 119/161 |
| 4,914,773 | A * | 4/1990 | Ham | A47L 11/29 15/3 |
| 5,100,280 | A * | 3/1992 | George, Jr. | B03C 1/18 198/510.1 |
| 5,732,658 | A * | 3/1998 | Wolters | A01K 1/0103 119/447 |
| 6,051,076 | A * | 4/2000 | Oechsle | D21F 1/32 134/144 |
| 6,210,095 | B1 * | 4/2001 | Hempel | B62B 1/22 180/19.1 |
| 6,941,703 | B2 * | 9/2005 | MacLean | A01K 1/0103 137/312 |
| 7,232,036 | B2 * | 6/2007 | Van Slyke | A01K 1/01 210/160 |
| 2011/0318150 | A1 * | 12/2011 | Kelderman | A01D 85/005 414/518 |
| 2012/0055414 | A1 * | 3/2012 | Correa | A01K 1/0029 119/448 |
| 2013/0019419 | A1 * | 1/2013 | Favagrossa | B60S 3/002 15/53.1 |

* cited by examiner

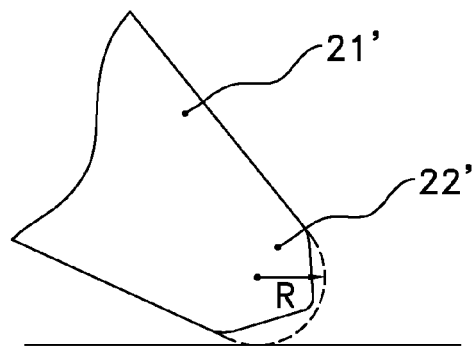
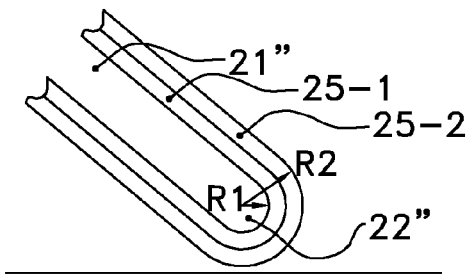
FIG. 2A  FIG. 2B
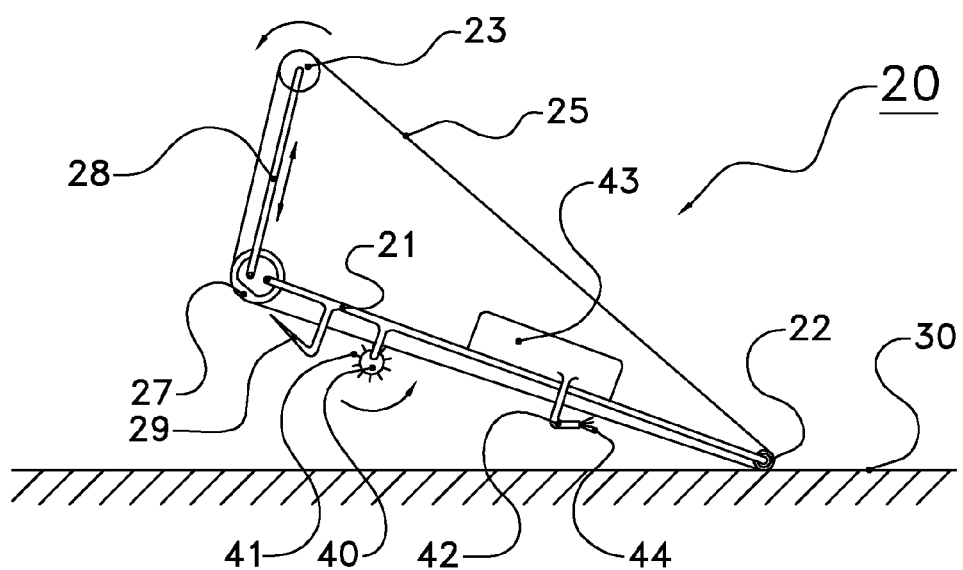
FIG. 3

SELF-PROPELLED ANIMAL-SHED VEHICLE FOR REMOVING MANURE AND AN ASSEMBLY OF SUCH AN ANIMAL-SHED VEHICLE AND AN ANIMAL-SHED FLOOR

The present invention relates to a self-propelled animal-shed vehicle for removing manure from a floor.

Several self-propelled animal-shed vehicles for removing manure from the floor are known from the prior art. For example, EP 1100317 A1 describes an unmanned vehicle for displacing manure having two wheels and a manure pusher resting on the floor.

A drawback of this known device is that, as more manure has to be pushed forwards, the resistance increases. Moving the manure and the vehicle forwards not only takes increasingly more energy, but the risk of wheelspin also increases, even making accurate navigation on the basis of wheel rotation measurement difficult. In addition, the floor thus becomes more slippery for the animals. Furthermore, this smearing of manure has the significant drawback that the emission of harmful substances, in particular of ammonia, is high.

It is an object of the present invention to reduce said problems, at least partly, or at least to provide a usable alternative.

The invention achieves this object by means of the self-propelled animal-shed vehicle according to claim 1, in particular a self-propelled animal-shed vehicle for removing manure from a floor, and comprising a frame having a first drive which is configured to move the animal-shed vehicle at a forward speed, a manure pick-up device, and a manure receiving means, wherein the manure pick-up device is configured to pick up manure from the floor and deposit it in the manure receiving means, wherein the manure pick-up device comprises a rotating, continuous manure pick-up belt, at least two spaced-apart reversing parts which are coupled to the frame and around which the belt can be rotatably moved, and a second drive which is configured to move the manure pick-up belt around the reversing parts, wherein the manure pick-up device is configured to keep the manure pick-up belt in contact with the floor by means of a bottom reversing part of the reversing parts during use of the manure removing device, and wherein the second drive is configured to move the manure pick-up belt at a peripheral speed, in such a manner that the manure pick-up belt moves from a bottom side of the bottom reversing part to a top side of the reversing part along the reversing part.

An advantage of the present invention is the fact that it picks up the manure from the floor and deposits it in a manure receiving means, such as in particular a manure collecting bin or bag, so that the slide resistance of manure which is situated in front of a pusher is insignificant, since it will be much lower than, for example, the rolling resistance of a drive. The manure is therefore picked up by the belt, wherein the belt is more efficient when picking up manure than a simple scraper since it effectively rotates around the reversing part. As a result, the manure is not only picked up from the floor, but, in addition, the manure pick-up belt exerts a scouring and cleaning action on the floor. A further significant advantage is the fact that the manure which is picked up is not spread across the floor. Thus, the floor will remain as clean as possible. This not only prevents animals from slipping and wheelspin, but in particular also prevents urine from ending up on a layer of spread out manure. Then, the urease present in the manure (bacteria therein) can convert the urea from the urine into ammonia. By removing the manure without spreading it, there is at least a relatively large floor area which is clean, thus preventing such a conversion.

From the prior art, the so-called Switl by the Japanese firm Furukawa is known per se. See, for example, http://www.youtube.com/watch?v=mDIHGhKHIdM. This is a hand-operated apparatus for picking up a jelly-like mass from a table or the like, and it comprises a flexible belt which is attached to a container on one side and is tightly fitted around an extendable spatula. By extending the spatula, which is very thin, the belt can be moved underneath the jelly-like mass and the frame can be picked up from the table or the like without losing shape. By retracting the spatula again, the belt can deposit the jelly-like mass again. Not only does this apparatus not relate to self-propelled vehicles or the removal of manure, but moreover the holding capacity is too limited to be of use in an animal shed. This is due to the fact that the Switl can only pick material because the belt is fixedly attached to one side, but cannot displace it.

Advantageous embodiments of the invention are described in the dependent claims and below.

According to the invention, the manure pick-up belt runs around the reversing parts, from a bottom side of the bottom reversing part to a top side thereof. In this case, the manure pick-up belt then moves to the top side of a top reversing part which is situated in a higher position than the bottom reversing part. Therefore, the manure pick-up belt will make an angle with the floor between these reversing parts. Obviously, this angle with the part of the floor which is still to be cleaned will be greater than ninety degrees. In use, the manure pick-up belt will then move backwards at the top side with respect to the forward speed.

In particular, the peripheral speed around the bottom reversing part is substantially at least as great as the forward speed. Thus, any amount of manure will, in particular, end up on the manure pick-up belt in its entirety, at substantially equal speed, or will even be pulled apart slightly, at a greater peripheral speed than the forward speed. This ensures efficient pick up of the manure from the floor. However, if desired, it is also possible to maintain a slightly smaller peripheral speed, although this will then nevertheless spread out the manure slightly. It should be noted that the aforementioned Switl also has a peripheral speed which is substantially equal to the forward speed of, in this case, the spatula. In case the bottom reversing part is movable with respect to the frame in the present invention, or at least with respect to the top reversing part, then the peripheral speed around the bottom reversing part, on average, has to be essentially at least as great as the average forward speed of the frame.

The first drive comprises, for example, a motor for driving the wheels. The second drive comprises, for example, a small electric motor. The first and second drive may thus be separate drives. However, they may also be coupled drives, comprising a single motor and one or more transmissions in between, since it is advantageous to have a peripheral speed which is at least dependent on the forward speed, in particular is at least as great. However, independent drives are not excluded.

In principle, the present invention is intended for picking up manure off a floor. Obviously, however, it is also possible to pick up a different material from the floor. Examples thereof are litter in an animal cubicle, remains of livestock feed etc. However, below manure will in each case be used by way of example, but it has to be borne in mind that "manure" may also be read as "material". One reason to choose in particular manure as material is due to the fact that manure is a tough, viscous and slightly tacky substance which has to be removed thoroughly from a floor in order to prevent soiling of the latter and possible contamination of animals as much as possible. In practice, the effective thickness of the manure pick-up device at the bottom reversing part is preferably dependent on the material to be removed. An advantageous effective thickness for manure has been found to be (rounded down) at most one inch, that is to say at most approximately 2.5 cm. Such a thickness has been found to be still useful with manure of, in particular, dairy cows. In this case, it should be noted that, depending on the type of animal, a different effective thickness may be more advantageous. Thus, the manure of a carnivorous animal will generally be thicker and more solid than that of dairy cows. In the present application, the expression "effective thickness" is understood to mean the thickness of the manure pick-up device at the location where it touches the ground, and in particular twice the radius of the described circular arch from a first point around the reversing part to a second point, wherein the first point is a transition point from a straight part of the manure pick-up belt to a curved part around the bottom reversing part and the second point is a top transition point from a straight part of the manure pick-up belt to said curved part. The curved part may comprise a side around which the manure pick-up belt moves, which side is preferably free from sharp edges. In particular, the side is rounded, but could also comprise a polygon, such as a part of a regular octagon, all this in such a manner that the manure pick-up belt does not have to move over a sharp edge, wherein sharp denotes an angle of 90 degrees or less. More particularly, the side is a circular arch. Still more particularly, the reversing part comprises a round shaft which is preferably mounted rotatably in the frame. Thus, minimum friction is caused when the manure pick-up belt travels around the bottom reversing part. All these considerations may also apply to the top reversing part. In addition, still more reversing parts may be provided, so that the manure pick-up belt can be given any desired path in the frame. It should be noted that the latter frame may be a separate frame which is, for example, movably attached to the frame, or main frame, of the animal-shed vehicle in its entirety. This mobility may, for example, be advantageous in order to make it possible for the manure pick-up belt, or at least the bottom reversing part, to follow the floor better.

As described above, the manure pick-up device has an effective thickness at the bottom reversing part, preferably at the spot where it touches the floor, of at most 1 inch (rounded down). Advantageously, in the case of manure from dairy cows, this effective thickness is preferably at most 2 cm. Empirical tests have shown that the manure pick-up properties of the animal-shed vehicle are optimal for such an effective thickness. The effective thickness roughly consists of a thickness of the reversing part and twice the thickness of the manure pick-up belt. If a shaft having a shaft radius is taken as the reversing part, then the effective curvature radius equals the curvature radius of the shaft. Even if the part of the bottom reversing part which is in contact with the manure pick-up belt is rounded cylindrically, the effective curvature radius equals the curvature radius of said cylindrically rounded part. With any other shapes, the effective thickness or effective curvature radius will refer to the diameter or radius of the (described) circle to which the top and bottom straight parts of the manure pick-up belt around the bottom reversing part are tangents. All the above obviously applies to the diameter, which is assumed to be constant.

In practice, it has been found that a configuration wherein the effective curvature radius, or the shaft radius, is at most 8 mm, preferably at most 5 mm, and wherein the material thickness is at most 6 mm, wherein the entirety satisfies the above-described limits, that is to say the total effective radius is at most ½ inch, preferably at most 1 cm, is advantageous. Advantageously, the effective thickness is between 8 and 16 mm, that is to say the effective total curvature radius is advantageously between 4 and 8 mm. Empirical tests have shown that using manure of dairy cows is a good compromise between maximum pick-up capacity of even small and thin slices of manure and justifiable wear of the manure pick-up belt as well as a still sufficiently small friction at the reversing part. Nevertheless, other effective thicknesses, shaft radii and thicknesses of manure pick-up belts are not excluded, such as, for example, based on the type of material to be picked up.

With regard to construction, the manure pick-up belt is not particularly limited. In particular, however, the manure pick-up belt comprises at least two layers of different material, comprising an outer layer for contact with the floor, and an inner layer, in particular wherein the outer layer is softer than the inner layer and comprises a plastic material with foam cells, more particularly closed foam cells. By providing at least two layers of different material, these materials can be chosen on the basis of their function. In particular, the inner layer comprises a non-stretch and bendable material which can withstand said bending. This may be, in particular, a fabric containing, for example, optical fibres or may comprise plastic fibres, but also, for example, a metal belt or the like. As has been mentioned above, the outer layer which comes into contact with the floor and the manure (the material to be picked up) preferably comprises a softer material with, more particularly, plastic foam cells, still more particularly closed foam cells. In empirical tests, such outer materials have been found to have a particularly good cleaning action. In this case, it should be noted that material with closed foam cells is compressible and adaptable, so that any unevenness of a floor can easily be followed. In addition, during production, manure pick-up belts comprising such closed-cell foam material will have open cells on the outer side which perform even better than entirely closed cells. An advantageous material for the outer layer which has a favourable wear pattern and pick-up properties has been found to be or comprise ethylene-vinylacetate copolymer (EVA). In addition, it should be noted that, although single-component materials are not excluded for the manure pick-up belt, in particular stretchable materials, such as EVA, would result in excessive elongation and stress during rotation of such a single-component manure pick-up belt.

As mentioned above, the top side of the manure pick-up belt will be at an angle to the floor and in particular at an obtuse angle relative to the forward direction of the animal-shed vehicle during use. The angle of the belt relative to the floor has been found to have little effect on the cleaning action itself. Advantageously, however, the top side of the manure pick-up belt is placed at 30-45 degrees to the horizontal (to the floor). In practice, it has been found that the material which has been picked up reliably stays on the manure pick-up belt at such an angle and does not fall or roll off. Obviously, this will improve further if the angle is made even smaller, but this will require the manure pick-up belt to be made longer, at least the distance between the bottom reversing part and the top reversing part will have to be increased before a sufficiently large and tall manure collecting bin can be put in place. This adversely affects the compactness and the conveying height. Nevertheless, such angles are readily possible under particular circumstances, such as in the case of very thinly liquid manure, such as manure/slurry mixture, or, on the contrary, dry manure.

In embodiments, the animal-shed vehicle according to the invention is provided with a spray nozzle comprising a liquid container containing liquid and configured to spray the liquid from the liquid container onto the manure pick-up belt. By means of the liquid, such a spray nozzle stimulates cleaning of the manure pick-up belt as well as the floor and provides a "wet clean", as it were. Due to the use of liquid, the manure pick-up belt acts as a kind of mop and is also better able to pick up the manure. In addition, the liquid reduces wear of the belt and the liquid soaks the edge of already (partly) dried-up manure. In particular, the liquid comprises a biocide in order to suppress the formation of bacteria on the floor and on remainders of manure. More particularly, the liquid comprises acidified water which has been found to be an inexpensive and efficient additive. However, other additives for the liquid are not excluded.

In particular embodiments, the animal-shed vehicle according to the invention comprises at least one manure pick-up belt cleaning device for removing manure from the manure pick-up belt which was picked up by the latter, in particular a scraper and/or a vibrator and/or a brush, wherein the manure pick-up belt cleaning device, during use, is in operative contact with the manure pick-up belt. Such a manure pick-up belt cleaning device then serves to remove manure which has not fallen from the manure pick-up belt into the manure receiving means solely on account of the force of gravity from the manure pick-up belt. In practice, for example, the scraper does not have to be in direct contact with the manure pick-up belt, and it may be sufficient to maintain a very narrow gap. Thus, the major part of the manure will be removed, while wear of the manure pick-up belt can be limited. In addition to direct physical contact, such a narrow gap which still enables the removal of manure is also understood to be covered by the expression "in operative contact", and a similar reasoning also applies for the brush. Preferably, the brush is drivable by means of a brush drive which is provided on the vehicle. Thus, an even better cleaning action can be provided. The brush drive is advantageously coupled to the second drive, so that the cleaning action is connected to the rotation of the belt. The vibrator may, for example, be an eccentric which is driven at a suitable frequency and which is in contact with the belt for at least part of each vibration.

In principle, the positioning of the at least one of the scraper and/or brush is free, but preferably the at least one of the scraper and/or brush is positioned at the location of the bottom half of the manure pick-up belt. Thus, the manure will fall from the manure pick-up belt on account of the force of gravity when it is loosened from said manure pick-up belt by means of the scraper and/or the brush. In particular, the at least one of the scraper and/or brush is placed above the manure receiving means in such a manner that, during use of the manure pick-up device, the manure removed from the manure pick-up belt will fall into the manure receiving means. In practice, this will often mean that the scraper and/or the brush is provided near the top reversing part, such as closely underneath or on the curvature, in particular at the location of the top reversing part.

In embodiments, the animal-shed vehicle according to the invention comprises a height adjustment device for raising the manure pick-up device, in particular the bottom reversing part. The raising is performed such that the manure pick-up belt is free from the floor. Thereby, the vehicle can drive e.g. to another workplace, wherein the manure pick-up device remains clear from the ground in between two workspaces. Thereby, the vehicle can move e.g. faster, such as when moving to a place in the shed where the manure pick-up device can be emptied, such as a manure pit. Advantageously, the height adjustment device may be used by the vehicle, in use in a shed with raised cubicles, to bring the manure pick-up device to a working height corresponding to the height of the raised floor of a cubicle. Thereby, the vehicle may remove e.g. manure from the floor of a cubicle, even when the cubicle floor is higher than the shed floor. A similar consideration holds for a lower floor.

With this height adjustment device it is also possible to adjust e.g. a height of the bottom reversing part of the manure pick-up device with respect to the shed floor and/or cubicle floor, which can be useful if the shed-vehicle is used for picking up the above described material other than manure, such as animal feed left-overs. Thereby, it is possible to opt for a limited floor clearance instead of direct contact of the manure pick-up belt with the floor, while fibrous material such as animal feed can still be removed from the floor. It is also possible to obtain a material dependent setting of the manure pick-up device, in particular of the manure pick-up belt around the bottom reversing part. For manure will often require direct contact of the manure pick-up belt with the floor, but a powdery animal feed can still be removed from the floor with a limited floor clearance of the manure pick-up belt at the bottom reversing part, and coarser feed can also be removed from the floor with a larger floor clearance of the manure pick-up belt at the bottom reversing part.

In embodiments, the height adjustment device comprises a manure pick-up device tilting device, arranged such that the manure pick-up device is tiltable with respect to the frame of the vehicle, whereby the manure pick-up belt is lifted from the floor at the bottom reversing part. This provides the advantages already described above. The tilting device may comprise for example one or more pressure cylinders, such as pneumatic or hydraulic pressure cylinders. Other tilting mechanisms, such as an electric motor and a connection tiltable thereby, between the frame and the manure pick-up device are however also possible.

In embodiments, the animal-shed vehicle comprises a collecting pusher which is situated in front of the manure pick-up device, viewed in the forward direction and which is wider than the manure pick-up belt and which is configured, while moving at the forward speed, to sweep up manure which is lying on the floor in a treatment area having the same width as the collecting pusher in order to place it in front of the manure pick-up device. Although a certain degree of spreading then occurs during sweeping up, this embodiment has the advantage that more manure can be collected simultaneously, which in turn may reduce the emission. In addition, it still efficiently prevents manure which has been collected by the pusher from being spread further, since it is immediately picked up by the manure pick-up belt.

The invention also relates to an assembly of an animal-shed vehicle according to the invention and an animal-shed floor which is configured to separate manure and urine which land thereon. The animal-shed vehicle according to the invention may in principle operate on any floor on which manure may be present, such as flat closed floors. However, the advantage of a clean floor and a low level of emissions is less apparent with floors where urine cannot drain off, but remains mixed in with the manure. However, if the urine is separated from the manure, the advantages described initially can be used to optimum effect.

In particular, the animal-shed floor comprises several discharge means for discharging the urine via the floor. Said discharge may take place through the floor, by means of openings which have been provided therein. In this case, it is an advantage of the invention that said openings are kept clean to a certain degree by the slight sweeping action of the manure pick-up belt. Grids are not considered as animal-shed floors in an assembly according to the invention, whereas non-closed animal-shed floors comprising slots or other openings are. Such animal-shed floors according to the invention thus comprise several discharge openings for the urine.

Alternatively or additionally, the floor slopes, in particular at an angle of between 3 and 10°, such as 4°, and the floor comprises a urine discharge channel, at least at the bottom. Thus, urine will flow downwards and be discharged via the discharge channel. As a result, there will be relatively little contact between urine and manure (urease), thus limiting emissions. It should be noted that such sloping floors which are additionally provided with openings for discharging urine through the floor may reduce emissions even further.

In embodiments, the floor has a wave-like profile of alternating peaks and troughs in at least one direction in cross section, with one of the discharge openings being situated in at least one of the troughs. With such a floor, the slope ensures that the urine is collected in an efficient manner in the vicinity of the discharge openings, so that an efficient separation occurs without the floor having to be made unnecessarily high when the surface increases.

In particular, the floor is substantially flat between a peak and an adjacent trough. That is to say that the profile is a triangular profile. Nevertheless, more rounded profiles are also possible, but these are more difficult to clean and to be stripped of manure than a triangular profile.

In embodiments, the floor is at least 1.5 meters wide between a peak and an adjoining trough. Such a width allows a cow to lie on the floor with its back facing a peak and without its legs extending over the channel. Thus, a relatively high degree of comfort is provided for the cows. In particular a width of the manure pick-up belt is substantially 1/N× the width of the floor, with N being a natural number. In this case, it is possible to clean the floor efficiently by passing the animal-shed vehicle over the floor section between a peak and adjoining trough in an N-fold zigzag movement. The term "substantially" is understood here to mean that the width is at least the indicated width, with at most some overlap. The overlap may be selected in dependence on the navigational accuracy of the animal-shed vehicle, the degree to which the manure is pushed aside instead of being picked-up, etc., and is in practice usually at most 20% of the width of the manure pick-up belt.

In particular embodiments, the floor comprises a top floor material which is compressible under the weight of an animal which is lying thereon, and has, in particular, a cushioning effect. Of course, all materials are slightly compressible, but the material has to have a cushioning effect which is suitable in particular for cows, and has to be visibly compressible by an average finger under the naked eye. In such a case, the material of the manure pick-up belt may also be homogenous and non-compressible. Any required adjustment in shape can then be effected by the floor material. This makes it possible to reduce wear of the manure pick-up belt in an efficient manner, in which case wear of the floor material is less relevant as each section of the floor only comes into contact with the manure pick-up belt a limited number of times, while the latter itself comes into contact with all sections of the floor.

Figure 4:
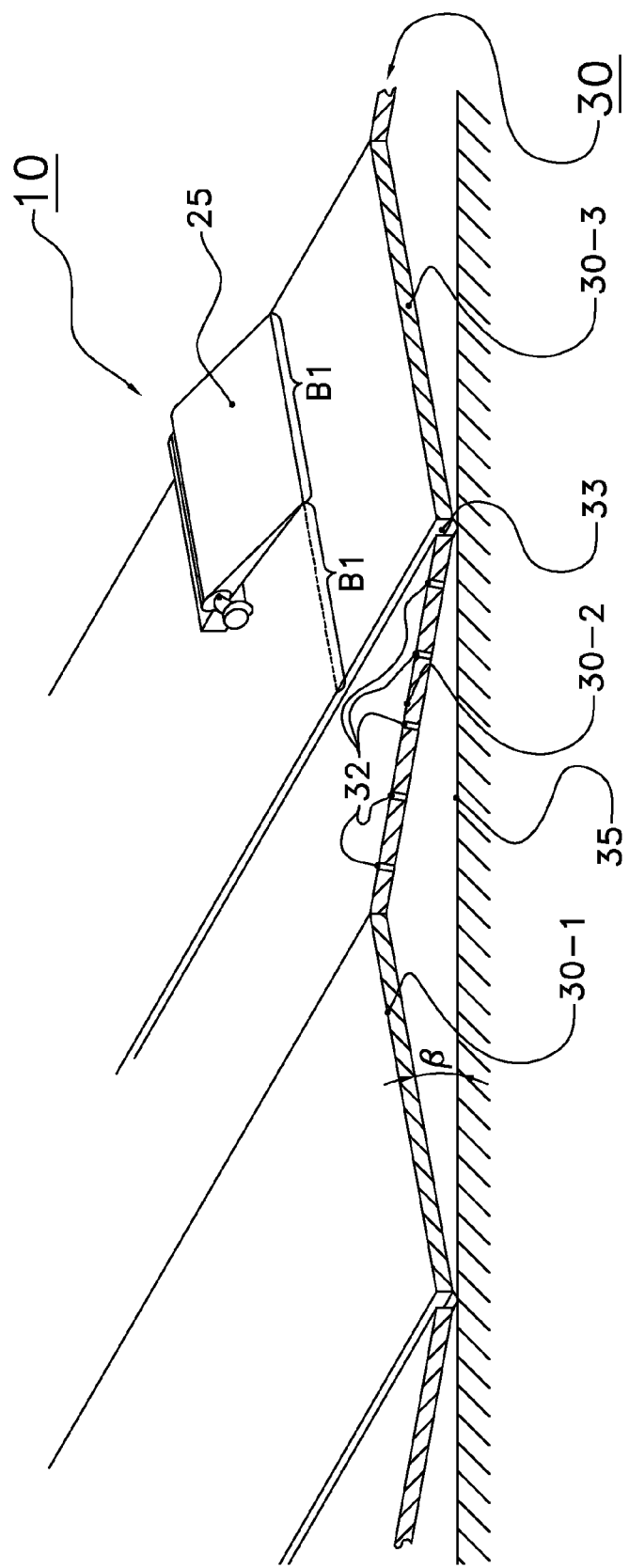
Figure 5:
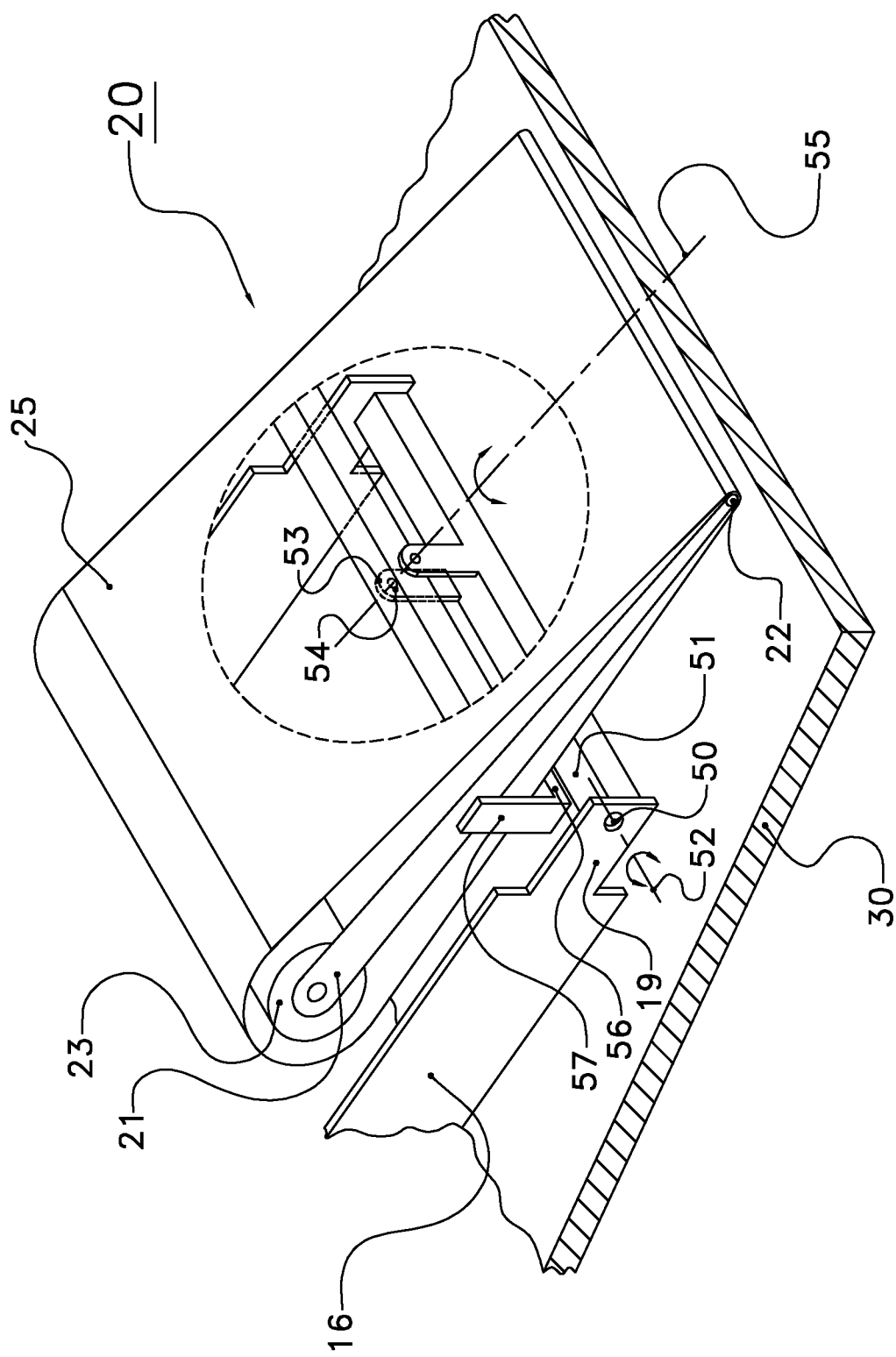
Figure 6A:
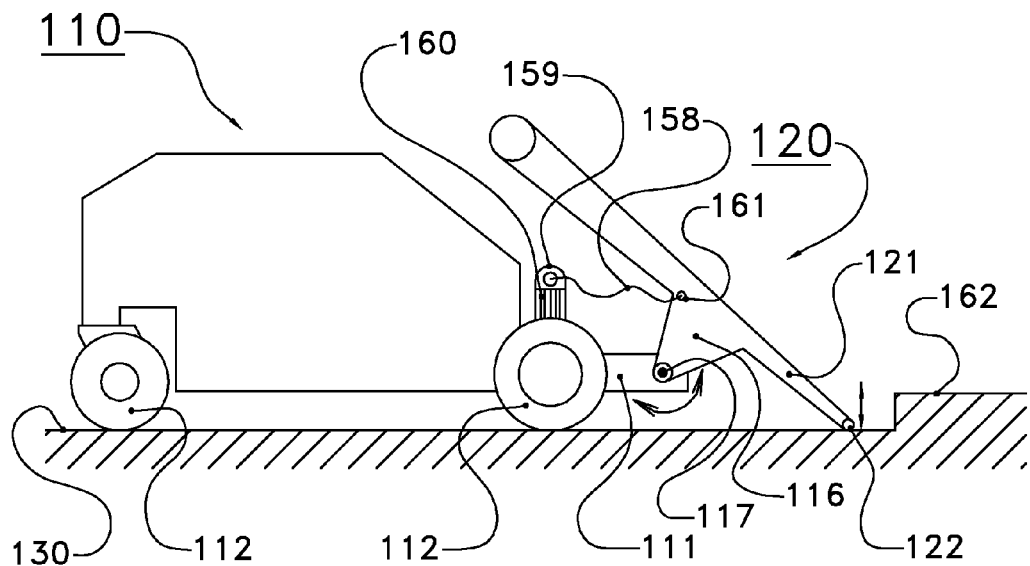
Figure 6B:
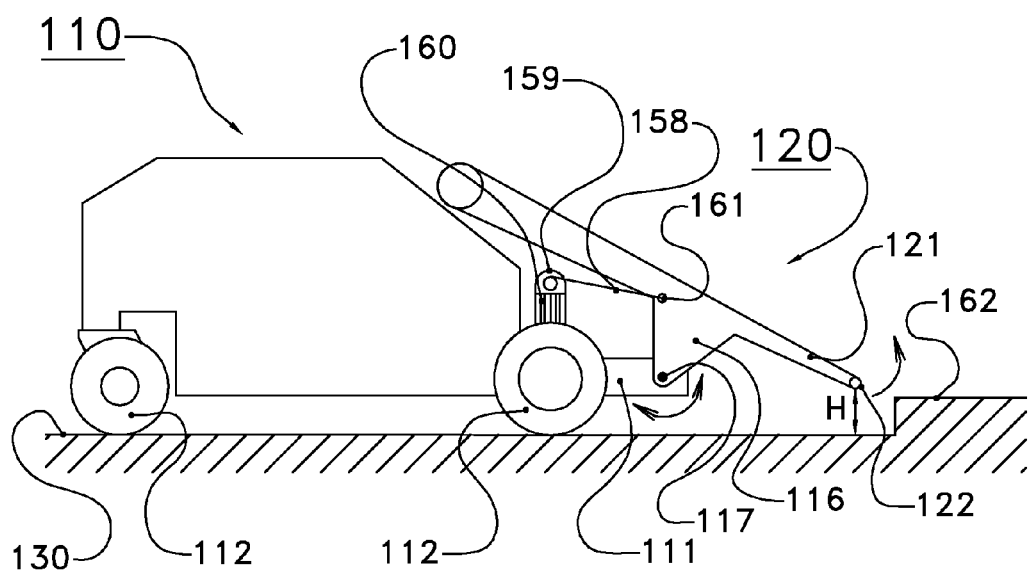

The invention will be explained in more detail below by means of some non-limiting examples and a drawing, in which:

FIG. 1 diagrammatically shows a partly cut-away side view of an embodiment of the animal-shed vehicle according to the invention;

FIG. 2 diagrammatically shows details of bottom parts of a manure pick-up device of an animal-shed vehicle according to the invention;

FIG. 3 diagrammatically shows a side view of an alternative manure pick-up device 20;

FIG. 4 diagrammatically shows a cross-sectional perspective view of an assembly of an animal-shed vehicle with an animal-shed floor according to the invention;

FIG. 5 diagrammatically shows a partly cut-away perspective view of an alternative manure pick-up device of an animal-shed vehicle according to the invention;

FIGS. 6A and 6B diagrammatically show an alternative embodiment of the shed-vehicle with a height adjustment device.

FIG. 1 diagrammatically shows a partly cut-away side view of an embodiment of the animal-shed vehicle according to the invention. The animal-shed vehicle is denoted overall by reference numeral 10, and comprises a frame 11 having one or more wheels 12 and a wheel drive 13, as well as a manure collecting bin 14 whose bottom 14-1 is rotatable about rotary shaft 15. A connecting part 16 comprising connecting joints 17 connects the frame 11 to the manure pick-up device 20, in particular a subframe 21 of the manure pick-up device. The device 20 furthermore comprises a small shaft 22 and a shaft 23 with a shaft drive 24, as well as a manure pick-up belt 25. The assembly is able to drive across a floor 30 littered with small heaps of manure 31.

The illustrated vehicle has a single rear wheel 12 which is configured as a steerable wheel which is driven by means of wheel drive 13. Underneath the subframe 21, there are two wheels 12 which serve as a support for the entirety of the animal-shed vehicle 10, and of the subframe with the manure pick-up belt in particular. It should be noted that any other configuration comprising at least one driven wheel and at least one steered wheel (which may be one and the same) is sufficient, such as two swivel wheels at the back and two separately drivable wheels at the front, or two driven wheels at the back and a steerable wheel at the front, etc. If desired, the manure pick-up belt 25 can provide some support. Nevertheless, it is advantageous to have at least three support wheels 12, so that the pressure on the pick-up belt does not become excessive.

The manure pick-up device 20 comprises a manure pick-up belt 25 which is driven by the shaft drive 24 via the shaft 23, more particularly in the direction of the single arrow. In this case, the manure pick-up belt rotates from the bottom side of the small shaft 22, which serves as the bottom reversing point, to the top side. As a result of the entirety of the vehicle 10 moving at a forward speed which approximately corresponds to the peripheral speed of the manure pick-up belt 25, the vehicle 10 will be able to pick up small heaps of manure 31 or other material from the floor 30 in a very efficient manner. In this case, the angle α between the belt 25 and the floor 30 is less important, as long as it does not become excessively large. In practice, an angle of 30-45° has been found to be satisfactory. In addition, the vehicle 10 does not become excessively long and difficult to handle as a result. Yet another reason is to do with the fact that the manure pick-up belt 25 deposits the picked-up small heaps of manure 31 in the manure collecting bin. If the angle α is too small, the height and thus the capacity of the manure collecting bin is undesirably small, if the total length of the vehicle 10 remains the same. The indicated angular range ensures that there is sufficient capacity for many purposes.

The manure collecting bin 14 has a bottom 14-1 which is configured to be rotatable about rotary shaft 15. If the container 14 has to be emptied, this can be effected by rotating the bottom about said rotary shaft 15. Emptying the container by rotation is generally more advantageous than emptying using a lid or the like, since a lid can quickly become soiled with manure to such a degree that it no longer opens and closes in a reliable manner.

A connection is provided between the frame 11 and the subframe 21 in the form of the connecting part 16. This is, for example, an elastically deformable part which can pivot about connecting joints 17, thus allowing rotation about a rotation axis 18 and about the joints 17 themselves. As a result thereof, the entirety of the manure pick-up device 20, and the manure pick-up belt 25 in particular, can follow any unevenness of the floor 30 well, thus increasing reliability and efficiency. It should be noted that alternative ways of following the floor are also possible, in which case it is advantageous to select (virtual) rotation axes for the manure pick-up belt in the plane of the belt 25 or below the latter, since this prevents the belt 25 from burying itself in the floor 30. In this connection, see FIG. 4 and the description thereof.

Here, the small shaft 22 which forms the bottom reversing part for the manure pick-up belt 25 has a diameter of 4 mm. The thickness of the belt is approximately 3 mm, so that the entire thickness at the bottom reversing part is approximately 10 mm. This provides a good "edge" and efficiency when picking up manure 31. The shaft 23 is preferably (much) larger in order to make the drive simpler and to reduce wear as much as possible.

FIGS. 2A/B diagrammatically show details of bottom parts of a manure pick-up device of an animal-shed vehicle according to the invention. FIG. 2A shows a frame 21' made in one piece, in which the bottom reversing part 22' is no longer a small shaft, but a slightly rounded part of the frame 21', such as a deflected plate part. The rounded part 22' is not a circular arch, but slightly angular. The described circle which touches the flat parts of the frame 21' is indicated by a dashed line and has a radius which is denoted by R. Here, the effective thickness of the bottom reversing part 22' is twice the radius R. In this case, the frame 21' is made in one piece, as has already been mentioned above, and may, for example, be a solid injection-moulded piece. Incidentally, the frame 21' may also be a hollow part, for example made of sheet material.

FIG. 2B diagrammatically shows (not to scale) an alternative frame 21" with a bottom reversing part 22", as well as a manure pick-up belt with an inner layer 25-1 and an outer layer 25-2. Here, the frame 21" is shown as a thin part with parallel surfaces. It tapers to the bottom reversing part 22" which is rounded by a circular arch with a radius R1. The manure pick-up belt 25 here comprises an inner layer 25-1 made of a strong and non-stretch fibre fabric material, as well as an outer layer 25-2 made of plastic closed-cell foam material, such as ethylene-vinylacetate copolymer. The total effective thickness is 2×R2, with R2−R1 being the thickness of the manure pick-up belt (25-1 plus 25-2).

FIG. 3 diagrammatically shows a side view of an alternative manure pick-up device 20 of an animal-shed vehicle according to the invention. As is the case in the entire drawing, identical parts are denoted by the same reference numeral, if required provided with one or more inverted commas (', ", etc.). The illustrated manure pick-up device comprises a subframe 21 with a bottom small shaft 22, as well as a top shaft 23 and an additional shaft 27 with a connection 28 in between. Reference numeral 29 denotes a scraper, reference numeral 40 a brush with brush hairs 41, and reference numeral 42 a spray nozzle which sprays a jet 44 from liquid container 43.

The connection 28 is resilient in the direction of the double arrow and, together with the additional shaft 27, it is thus possible to maintain the manure pick-up belt 25 under the desired tension. Such a resilient connection could also be applied between the shaft 23 and the small shaft 22.

The optional scraper 29 and the brush 40 which is rotatable in the direction of the arrow are able to ensure that the belt reaches the bottom reversing point 22 as free from manure as possible. In this case, the scraper 29 can scrape off the largest portions, following which the brush 40 can remove the last remains of manure by means of the brush hairs 41. All these remains of manure preferably fall into the manure collecting bin (not shown here). Incidentally, there are other parts which are likewise not shown, such as the drive of the manure pick-up belt and (the connection to) the frame of the animal-shed vehicle.

The optional spray nozzle 42 sprays a jet 44 onto the manure pick-up belt. To this end, liquid is supplied from the liquid container 43 which could incidentally also be provided on the frame of the animal-shed vehicle. The liquid advantageously has a good cleaning action, so that the manure pick-up belt, in particular by contact with the floor 30, is cleaned thoroughly. In addition, a manure pick-up belt 25 which has been moistened in this way has an improved cleaning action, for example in particular due to the edge of small heaps of manure having been softened. In addition, the liquid may be provided with additives, such as an acid or a(nother) biocide. This supports the reduction of contamination and emission by means of manure which has remained behind on the floor, and reduces wear.

FIG. 4 diagrammatically shows a cross-sectional perspective view of an assembly of an animal-shed vehicle with an animal-shed floor according to the invention.

The animal-shed vehicle 10 comprises a manure pick-up belt 25 across substantially its entire width. The floor comprises floor sections 30-1, 30-2, 30-3, . . . , which are arranged in a triangular profile, at an angle β to the horizontal subfloor 35. Reference numeral 32 denotes openings and reference numeral 33 discharge ducts.

The floor 30 comprises floor sections which have a triangular profile of alternate peaks and troughs and which therefore slope. For the sake of clarity, the angle of the slope has been exaggerated here, but it is, for example, approximately 4°. The floor 30 is configured to separate manure and urine which land thereon. An important aim of this separation is to reduce the emission of ammonia which is mainly produced when acidic urine comes into contact with droppings. For the purpose of this separation, the floor 30 comprises the discharge ducts 33 as well as optional openings which are suitable therefor and which are shown here diagrammatically and only denoted by reference numeral 32 in floor section 30-2. The urine which seeps away through the openings 32 and that which runs down across the floor 30 is collected and discharged by means of discharge ducts 33. Thus, only relatively dry, solid manure will remain behind on the floor.

The width of the manure pick-up belt 25, and thus in fact the effective width of the animal-shed vehicle 10, is denoted in the figure as B1. Preferably, the floor sections have a width equal to or slightly smaller than a multiple of B1. Here, each floor section has a width of 2×B1, with other ratios, such as 3× or 4×, also being possible. As a result thereof, the animal-shed vehicle can keep each floor section clean efficiently by driving to and fro. In addition, each floor section preferably has a width of at least 1.5 meters, at least for dairy cows. Thus, a cow may lie between two floor sections with its back facing the peak, without its legs extending over a discharge duct. Thus, efficient cleaning of the floor is still ensured.

The floor sections 30-1, . . . , are shown here as being single-layer floor sections and in that case preferably consist of slightly compressible material. In this case, the manure pick-up belt 25 may be made of slightly harder, more wear-resistant material. Incidentally, the floor sections can then also be supported by a subfloor 35 which also has a triangular profile. Alternatively, the cavity between the floor sections with a triangular profile and a flat subfloor 35 can be filled with a suitable material, such as sand or the like.

FIG. 5 diagrammatically shows a partially cut-away perspective view of an alternative manure pick-up device for an animal-shed vehicle according to the invention.

Here, reference numeral 16' denotes a connecting part. The connecting part 16' tapers to an extension lip 19 with a first opening 50, in which a first crossbeam 51 can rotate about a first rotation axis 52. On the first crossbeam 51, first upright parts 53 are provided, each having a second opening 54 in which a second crossbeam 56 is provided so as to be able to rotate about second rotation axis 55. At its ends, the second crossbeam 56 has second upright parts to which the subframe 21 comprising the shaft 23, the small shaft 22 and the manure pick-up belt 25 is attached.

In this embodiment, the manure pick-up device 20 is connected to the frame (not shown) of the animal-shed vehicle via connecting parts 16', in this case rigid plates, and thus not deformable like parts 16 in the embodiment from FIG. 1. The movability is provided by the further construction which will be discussed now. Firstly, each part 16' tapers to an extension lip 19 which is provided with a first opening 50. In these openings 50, a first crossbeam 51 is provided which can rotate about the first rotation axis 52 which runs through the first openings 50. As a result thereof, a first degree of freedom for the manure pick-up device and belt is provided in order to be able to follow any unevenness in the floor.

Two first upright parts 53, such as metal platelets, are provided on the first crossbeam 51. These first upright parts 53 each have a second opening 54 near their top end. These two second openings 54 define a second rotation axis 55 which corresponds to the rotation axis 18 from FIG. 1 in terms of function. In the present FIG. 5, a second crossbeam 56 is provided which is accommodated in the second openings 54 so as to be rotatable about the second rotation axis 55. At the ends of the second crossbeam, second upright parts 57 are provided, each of which is connected to a side of the subframe 21. Thus, a second degree of freedom is provided for the manure pick-up device and belt, which is therefore very well able to overcome any unevenness on the floor. In particular, the second openings 54 are aligned in such a manner that the second rotation axis 55 passes through the centre of the small shaft 23 and does not pass above or below the latter. This ensures that the manure pick-up belt 25 does not have to move to the left or right on balance if unevenness in the floor has to be overcome, and that the corners do not bury themselves in the floor too far.

FIG. 6A diagrammatically shows in a side view an embodiment of the shed-vehicle according to the invention, provided with a height adjustment device. As far as the parts correspond to the embodiment of FIG. 1, the same reference numerals have been used, increased by 100.

FIGS. 6A and 6B show, in a side view, the vehicle 110 with the manure pick-up device 120 and the connecting part 116 that connects the frame 111 of the vehicle to the manure pick-up device 120, in particular with the subframe 121. The connecting part 116 is rotatably connected to the frame by means of a connection joint 117. There is no connection joint between the connecting part 116 and subframe 121, and the connecting part may even be formed fixed or unitary with the subframe 121. The pivot that is formed by the connection joint 117 is positioned at the lower side of the sub frame 121 and in front of the wheels 112. Also indicated in the FIGS. 6A and 6B is a cubicle floor 162 that is higher than the shed floor 130.

The height adjustment device comprises a rope 158, rope winding device 159 and motor 160 for driving the rope winding device. The height adjustment device is provided on the frame 111 near the connecting part 116. A first end of the rope 158 is connected to the connecting part 116 at connecting point 161 which is positioned at a vertical distance above the connecting joint 117, the other end of the rope is connected to the rope winding device 159. FIG. 6A shows the manure pick-up device 120 (the manure pick-up belt has not been shown) in contact with the shed-floor 130 at the bottom reversing part 122. In this position of the manure pick-up device 120, the cord 158 of the height adjustment device is in a first wound-up state wherein the rope length between the winding device 159 and the connecting point 161 at the connecting part 116 is at a maximum, and the manure pick-up device 120 and the manure pick-up belt (not shown in figure set 6) keeps contacting the shed floor 130 at the bottom reversing part 122.

FIG. 6B shows the manure pick-up device 120 (the manure pick-up belt is not shown) in a raised state, at the bottom rounding part 122 and the bottom rounding part 122 itself is also clear from the shed floor 130. In this position of the manure pick-up device 120, the rope 158 of the height adjustment device is in a second wound-up state, wherein the rope length between the winding device 159 and the connecting point 161 on the connecting part 116 is shorter than maximum, and the manure pick-up device 120 and the manure pick-up belt (not shown in FIG. 6) at the bottom reversing part 122 is clear from the shed floor 130. The height H of the manure pick-up device at the bottom reversing part 122 with respect to the shed floor 130 can be set by means of the rope winding device 159 and the motor 160. The number of turns of the rope 158 around the rope winding device 159 has a direct influence on the rope length between the winding device 159 and the connecting point 161. The rope winding device 159 may be provided with means to count the number of turns of the rope winding device (such as e.g. a rotary encoder), and a control system may control the motor 160 on the basis of the number of turns, in dependence of the desired position of the manure pick-up device. There could also be provided an abutment between the subframe 121 and the frame 111 of the vehicle, that limits the maximum pivot stroke of the sub frame 121 around the connecting joint 117 in the direction of the vehicle frame and/or prevents that the manure pick-up device falls against the vehicle, in particular the manure collecting bin.

The illustrated embodiments are only intended to explain the invention by means of a few non-limiting examples, and the scope of protection is determined by the attached claims.

The invention claimed is:
1. A self-propelled animal-shed vehicle for removing manure from an animal-shed floor, and comprising:

a frame having a first drive which is configured to move the animal-shed vehicle at a forward speed;
a manure pick-up device; and
a manure receiver,
wherein the manure pick-up device is configured to pick up manure from the animal-shed floor and deposit the manure in the manure receiver,
wherein the manure pick-up device comprises:
 a rotating, flat continuous manure pick-up belt;
 at least two spaced-apart reversing parts which are directly coupled to a subframe enclosed by the pick-up belt, and the belt is rotatably moved around said reversing parts; and
 a second drive enclosed by the pick-up belt and configured to move the manure pick-up belt around the reversing parts,
wherein the manure pick-up device is configured to keep the manure pick-up belt in contact with the animal-shed floor by means of a bottom reversing part of the reversing parts during rotation of the manure pick-up device,
wherein the second drive is configured to move the manure pick-up belt at a peripheral speed, in such a manner that the manure pick-up belt moves from a bottom side of the bottom reversing part to a top side of the bottom reversing part along the bottom reversing part, and
wherein the peripheral speed around the bottom reversing part is substantially at least as great as the forward speed.

2. The animal-shed vehicle according to claim 1, wherein an effective thickness of the manure pick-up device at the bottom reversing part is at most 1 inch.

3. The animal-shed vehicle according to claim 1, wherein the bottom reversing part has an effective curvature radius of at most 8 mm.

4. The animal-shed vehicle according to claim 1, wherein the manure pick-up belt comprises at least two layers of different material, comprising an outer layer for contact with the animal-shed floor.

5. The animal-shed vehicle according to claim 1, wherein the top side of the manure pick-up belt is placed at 30-45° to a horizontal plane.

6. The animal-shed vehicle according to claim 1, provided with a spray nozzle comprising a liquid container for a liquid and configured to spray the liquid from the liquid container onto the manure pick-up belt, wherein the liquid comprises a biocide.

7. The animal-shed vehicle according to claim 1, comprising a manure pick-up belt cleaning device for removing manure from the manure pick-up belt which was picked up by the latter, the manure pick-up belt cleaning device comprising at least a scraper and/or a vibrator and/or a drivable brush, wherein the scraper and/or vibrator and/or brush, during use, is in operative contact with the manure pick-up belt.

8. The animal-shed vehicle according to claim 7, wherein the manure pick-up belt cleaning device is positioned at the location of the bottom half of the manure pick-up belt, and above the manure receiver in such a manner that, during use of the manure pick-up device, the manure removed from the manure pick-up belt will fall into the manure receiver.

9. The animal-shed vehicle according to claim 1, comprising a height adjustment device for raising the bottom reversing part of the manure pick-up device.

10. An assembly, comprising:
the animal-shed vehicle according to claim 1; and
an animal-shed floor which is configured to separate manure and urine which land thereon,
wherein the animal-shed floor comprises several discharge openings for discharging the urine through said animal-shed floor.

11. The assembly according to claim 10, wherein the animal-shed floor slopes and the animal-shed floor comprises a urine discharge channel, at least at the bottom.

12. The assembly according to claim 10, wherein the animal-shed floor has a wave-like profile of alternating peaks and troughs in at least one direction in cross section, with one of the discharge openings being situated in at least one of the troughs.

13. The assembly according to claim 10, wherein the animal-shed floor is substantially flat between a peak and an adjoining trough.

14. The assembly according to claim 12, wherein the animal-shed floor between a peak and an adjoining trough is at least 1.5 m wide, the width of the manure pick-up belt being substantially 1/N× the width of the animal-shed floor, with N being a natural number.

15. The animal-shed vehicle according to claim 1, wherein the manure receiver is a manure collecting bin or a manure collecting bag.

16. The assembly according to claim 10, wherein the animal-shed floor comprises several discharge mechanisms configured to discharge the urine via the animal-shed floor.

17. The animal-shed vehicle according to claim 1, wherein an effective thickness of the manure pick-up device at the bottom reversing part is between 8 and 16 mm.

18. The animal-shed vehicle according to claim 1, wherein the bottom reversing part has an effective curvature radius of at most 5 mm.

19. The animal-shed vehicle according to claim 1, wherein the manure pick-up belt comprises at least two layers of different material, comprising an outer layer for contact with the animal-shed floor, and an inner layer, wherein the outer layer is softer than the inner layer and comprises a plastic material with closed foam cells.

* * * * *